United States Patent [19]
Caviglia et al.

[11] Patent Number: 5,780,945
[45] Date of Patent: Jul. 14, 1998

[54] SWITCHED RELUCTANCE MACHINE BALANCING SYSTEM: MATERIAL REMOVAL APPROACH AND MATERIAL ADDITION APPROACH

[75] Inventors: Antonio P. Caviglia, St. Louis, Mo.; Don Williams, Andover, United Kingdom

[73] Assignee: Emerson Electric Co., St. Louis, Mo.

[21] Appl. No.: 822,067

[22] Filed: Mar. 24, 1997

[51] Int. Cl.$^6$ .................................................. H02K 5/24
[52] U.S. Cl. .................................................. 310/51; 310/42
[58] Field of Search .......................... 310/51, 42; 29/598

[56] References Cited

U.S. PATENT DOCUMENTS

| | | | |
|---|---|---|---|
| 3,487,248 | 12/1969 | Kaneko et al. | 310/51 |
| 3,657,582 | 4/1972 | Phelon | 310/156 |
| 3,659,129 | 4/1972 | Pettersen | 310/216 |
| 3,943,391 | 3/1976 | Fehr | 310/103 |
| 3,995,203 | 11/1976 | Torok | 318/166 |
| 4,469,970 | 9/1984 | Neumann | 310/156 |
| 4,916,346 | 4/1990 | Kliman | 310/216 |
| 4,918,831 | 4/1990 | Kliman | 29/598 |
| 4,933,583 | 6/1990 | Ripplinger | 310/156 |
| 5,023,502 | 6/1991 | Johnson | 310/261 |
| 5,045,742 | 9/1991 | Armstrong et al. | 310/254 |
| 5,053,666 | 10/1991 | Kliman et al. | 310/261 |
| 5,111,096 | 5/1992 | Horst | 310/168 |
| 5,166,569 | 11/1992 | Shervington et al. | 310/261 |
| 5,282,309 | 2/1994 | La Rue | 29/736 |
| 5,300,845 | 4/1994 | Fanning et al. | 310/217 |
| 5,323,080 | 6/1994 | Shahamat et al. | 310/261 |
| 5,554,900 | 9/1996 | Pop, Sr. | 310/156 |
| 5,576,585 | 11/1996 | Cardini et al. | 310/51 |

FOREIGN PATENT DOCUMENTS

| | | | |
|---|---|---|---|
| 0 157 526 | 6/1990 | European Pat. Off. | H02K 19/24 |
| 0 668 652 | 8/1995 | European Pat. Off. | H02K 19/10 |
| 6-62540 | 3/1994 | Japan | H02K 1/24 |
| 114562 | 5/1968 | United Kingdom | H02K 1/02 |
| 2 172 443 | 9/1986 | United Kingdom | H02K 1/28 |

OTHER PUBLICATIONS

*Soviet Inventions Illustrated*, Week 8829, Aug. 31, 1988 (English Abstract), (author unknown).

A. J. Hutton and T. J. E. Miller, "Use of Flux Screens in Switched Reluctance Motors," pp. 312–316, Proc. EMD, Sep. 1989, London.

Stephenson and Blake, "The Characteristics, Design and Applications of Switched Reluctance Mototrs and Drives," PCIM Xonference & Exhibition, Jun. 21–24, 1993, Nuremburg, Germany.

*Primary Examiner*—Steven L. Stephan
*Assistant Examiner*—Judson H. Jones
*Attorney, Agent, or Firm*—Arnold, White & Durkee

[57] ABSTRACT

This invention provides methods and apparatus for balancing the rotor of switched reluctance machines. The first embodiment of this invention provides a method and apparatus for balancing the rotor of a switched reluctance machine by removing material from added disks. A second embodiment provides a method and apparatus for balancing the rotor of a switched reluctance machine by adding balancing compound to balancing sleeves which fit into the rotor stack.

30 Claims, 3 Drawing Sheets

SWITCHED RELUCTANCE MACHINE BALANCING SYSTEM: MATERIAL REMOVAL APPROACH AND MATERIAL ADDITION APPROACH

FIELD OF THE INVENTION

This invention relates to methods and apparatus for balancing the rotors of reluctance machines.

BACKGROUND OF THE INVENTION

With speeds ranging up to 30,000 r.p.m.'s or greater, high-speed reluctance machines demand accurate, dynamic, two-plane balancing. Proper balancing can improve a machine's performance, reduces a machine's operating noise, and extends a machine's operating life.

Conventional reluctance machines contain a rotor which rotates continuously. If the mass of the rotor is unevenly distributed relative to the axis of rotation, then the rotor may wobble and quiver as it rotates. Besides producing noise, this excess motion causes the machine to operate less efficiently. In addition, these structural vibrations can cause fatigue in the machine's components and in any structure coupled to the rotor, and this wear-and-tear may result in premature deterioration of the machine.

Current methods of balancing the rotors of electric machines typically involve removing a portion of the active rotor material at selected locations on the rotor. By requiring machining operations on the rotor itself, these processes can produce stress and fatigue on the rotor. Furthermore, removing active rotor material can interfere with the operation of the machine. This is especially true with switched reluctance machines, where the width of the air-gap between the rotor poles and the stator poles can significantly affect machine performance. To the extent that active rotor material is removed from a rotor pole, the air-gap that will exist between that rotor pole and the stator poles may be increased, resulting in a reduction of the torque capabilities of the machine and degraded machine performance. Further, because the rotor is active material in which a flux linkage is created to produce torque, the removal of rotor material causes a degradation in the machines torque production. Thus, to date, efforts to resolve the problem of balancing a rotor in a switched reluctance machine have proven inadequate.

This invention provides a simple, efficient means of balancing a rotor in a reluctance machine without these complications.

SUMMARY OF THE INVENTION

In accordance with one aspect of the present invention, there is provided a method of balancing the rotor of a reluctance machine, wherein a disk is fitted to one side of the rotor, and material is removed from the disk to balance the rotor.

In accordance with another aspect of the present invention, there is provided a reluctance machine comprising a rotor, and a disk fitted to one side of the rotor from which material has been removed to balance the rotor.

In accordance with still another aspect of the present invention, there is provided a method of balancing the rotor of a reluctance machine, wherein a balancing sleeve is attached to the rotor, and a balancing compound is deposited in the balancing sleeve to balance the rotor.

In accordance with still another aspect of the present invention, there is provided a reluctance machine comprising a rotor, a balancing sleeve attached to the rotor, and a balancing compound deposited in the balancing sleeve.

Other aspects of the present invention will be apparent to one of ordinary skill in the art having the benefit of this disclosure.

BRIEF DESCRIPTION OF THE DRAWINGS

The accompanying drawings illustrate a few of the various ways to practice this invention.

DESCRIPTION OF ILLUSTRATIVE EMBODIMENTS

Figure 1:
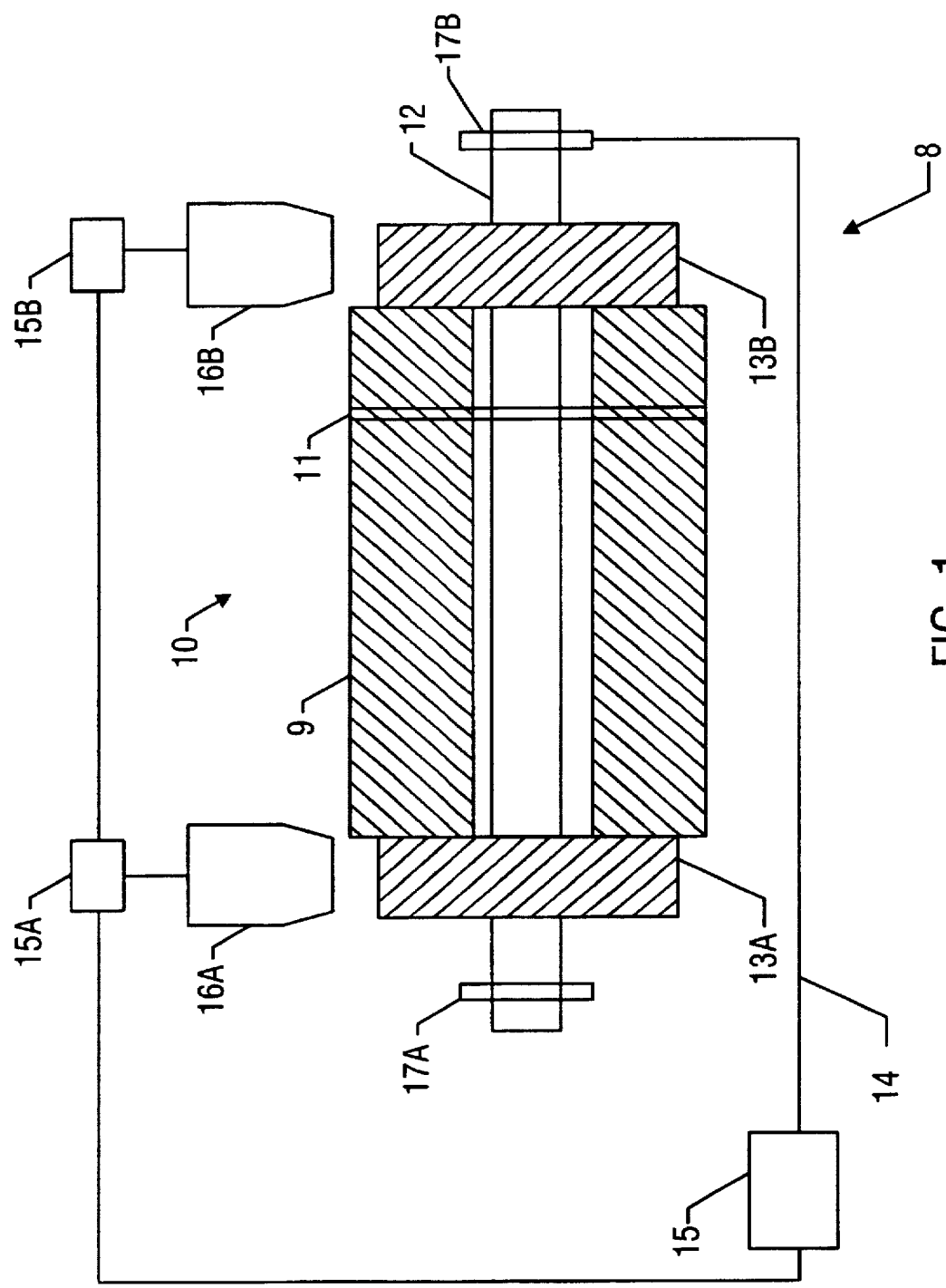
FIG. 1 displays a material removal tooth and the length of a switched reluctance s machine fit with two attached balancing disks.

Turning to the drawings and, in particular, to FIG. 1, an apparatus 8 for balancing a rotor in a switched reluctance machine according to a first method of the present invention is illustrated. Although this description is directed in particular to a switched reluctance machine, the principles described herein apply equally to other reluctance machines, including synchronous reluctance machines.

In general, a rotor 10 is provided that, in the exemplary embodiment comprises a stack 9 of substantially identical rotor laminations 11 that is mounted to a rotor shaft 12. The construction of the rotor 10, including the construction of the rotor stack 9, the shaft 12, and the mounting of the stack 9 on the shaft 12 may be conventional.

Figure 2:
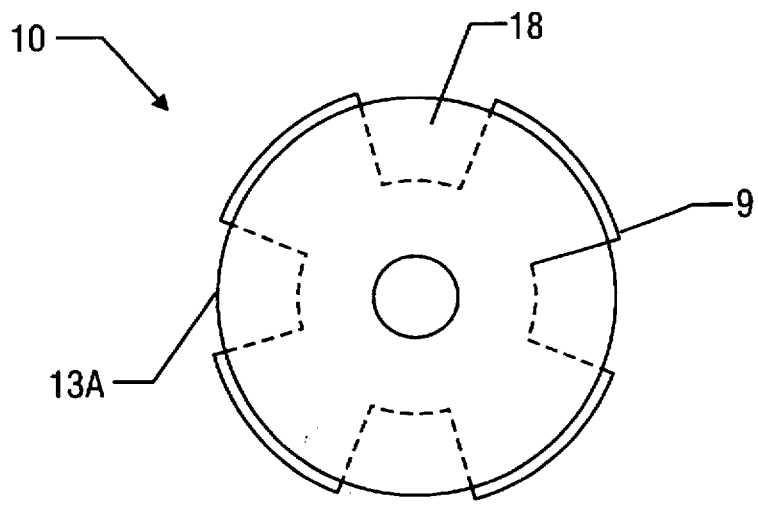
FIG. 2 displays the end of a switched reluctance machine with an attached balancing disk.

Positioned at opposing ends of the rotor stack 9 are two balancing disks 13A and 13B. In the embodiment of FIG. 1, the balancing disks 13A and 13B are substantially identical and constitute two circular disks, where the maximum outer diameter of the disks 13A and 13B is slightly less than the maximum outer diameter of the rotor 10 as measured across opposing rotor poles. This is reflected in FIG. 2 which provides an end-view of the rotor 10/balancing disks 13A and 13B combination. As illustrated in that Figure, the outer diameter of the rotor stack 9 as measured across opposing rotor poles is greater than the outer diameter of the balancing disks.

The balancing disks 13A and 13B may be constructed of any suitable material but, in general, non-active (e.g., non-paramagnetic and non-magnetic) material, preferably aluminum, should be used to avoid interference with the magnetics of the reluctance machine in which rotor 10 is to be used. In the embodiment of FIG. 1, the balancing disks 13A and 13B comprise non-magnetic metal but it will be appreciated by those of ordinary skill in the art that other materials, e.g., ceramic, may be used to construct the balancing disks.

The balancing disks 13A and 13B may be affixed to the shaft 12 in any suitable manner. In the embodiment of FIG.

1, the balancing disks 13A and 13B are wedged onto a knurl which is formed on shaft 12 and which also holds the rotor stack 9 in place.

In addition to providing for efficient balancing of the rotor 10 according to the methods described below, positioning the balancing disks 13A and 13B proximate to the rotor stack 9 provides several other advantages. For example, while the outer diameter of the disks 13A and 13B is slightly less than the outer diameter of rotor stack 9 measured from rotor pole tip to rotor pole tip, the outer diameter of the balancing disks 13A and 13B is greater than the outer diameter of the rotor when measured across opposing interpole rotor regions 18. Thus, the balancing disks 13A and 13B "close" up the troughs defined by the interpole regions 18 of the rotor and tend to inhibit air-flow through these regions. This reduction in airflow tends to reduce windage noise and to reduce windage losses associated with the machine in which the rotor 10 is used.

In addition to reducing windage noise and windage losses, the mounting of the balancing disks 13A and 13B proximate to rotor stack 9 provides additional support for the rotor laminations in that the disks 13A and 13B will tend to press against the rotor laminations, thus tending to hold the rotor stack 9 together. This additional support tends to prevent undesirable boring out of the rotor laminations.

The combination of the rotor 10 and the balancing disks 13A and 13B may be placed in rotor shaft mounts 17A and 17B of an appropriate balancing apparatus 14, that spins the rotor and detects any imbalances in the rotor. Balancing devices along these lines are generally known in the art and the construction of such a device should be within the ability of one of ordinary skill in the art having the benefit of this disclosure.

Figure 3A:
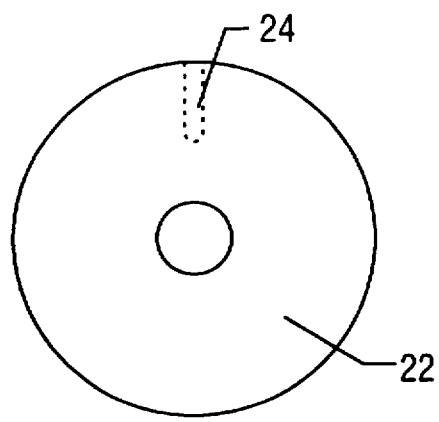
FIGS. 3A, 3B, and 3C illustrate front and side views of a balancing disk having a cavity drilled therein.
Figure 3B:
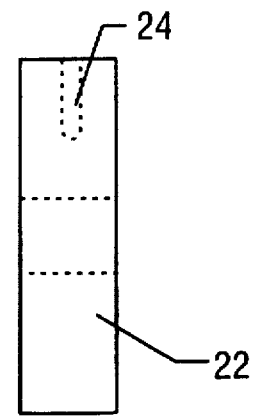
Figure 3C:
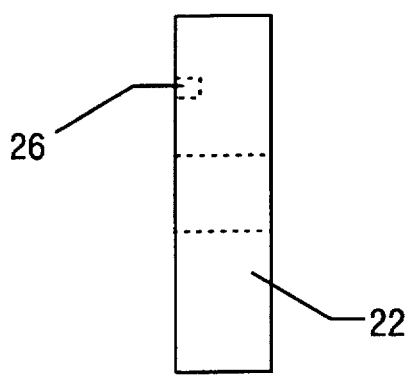

The output of the balancing apparatus 14 may be provided to a main processor 15 such as a programmed processor of a specially programmed controller. The processor 15 may receive the imbalance information from apparatus 14 and provide control signals to controllers 15A and 15B which in turn are coupled to material removal tools 16A and 16B. Controllers 15A and 15B may be any suitable control elements that can respond to control signals to move the material removal tools in a direction substantially perpendicular to the axis of rotation of the rotor. In general, material removal tools 16A and 16B may be elements, such as a tooth, capable of shaving off or otherwise selectively removing material from the balancing disks 13A and 13B. In another embodiment, material removal tools 16A and 16B could selectively drill one or more cavities in the balancing disks, either parallel or perpendicular to the shaft 12, to remove material from the disks without decreasing their diameter. Front and side views of a balancing disk 22 having a cavity 24 perpendicular to shaft 12 drilled therein are illustrated in FIGS. 3A and 3B. In this case, the diameter of the drill should be no larger than 75% of the thickness of balancing disk 22. FIG. 3C illustrates balancing disk 22 having a cavity 26 parallel to shaft 12 drilled therein.

According to one method of the present invention, the rotor 10 is rotated at an appropriate speed and the apparatus 14 is used to detect imbalances in the rotor assembly. The processor 15 detects these imbalances and provides control signals to the controllers 15A and 15B which cause material removal tools 16A and/or 16B to move to a position where they can selectively remove material from balancing disks 13A and/or 13B, meaning that material is removed in appropriate amounts from appropriate locations to balance the rotor.

The use of balancing disks 13A and 13B is believed to be beneficial in that it provides the potential for removing material over the entire 360 degree diameter of the balancing disks at a significant diameter. This significant surface area over which material may be removed to balance the rotor 10 is believed to provide for an efficient and flexible rotor balancing system. Moreover, because the material from which balancing disks 13A and 13B are formed is preferably non-active (e.g., non-paramagnetic and non-magnetic), the removal of material from these disks does not appreciably affect the operation of the reluctance machine in which rotor 10 is to be used.

Figure 4:
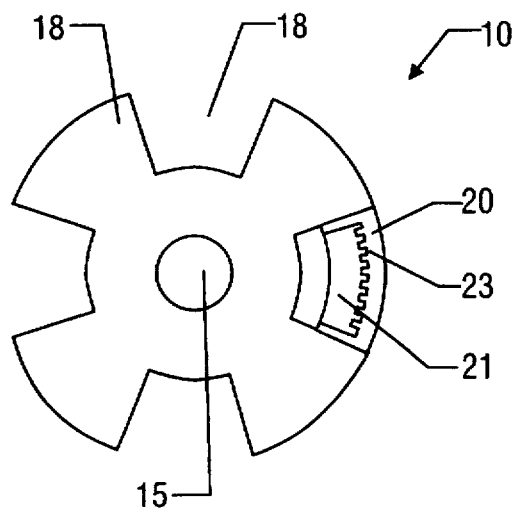
FIG. 4 displays the end of a switched reluctance machine balanced by an attached balancing sleeve containing a balancing compound.
Figure 6A:
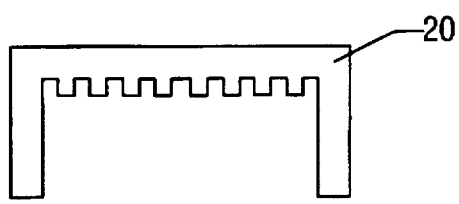
FIG. 6A illustrates a balancing sleeve.
Figure 6B:
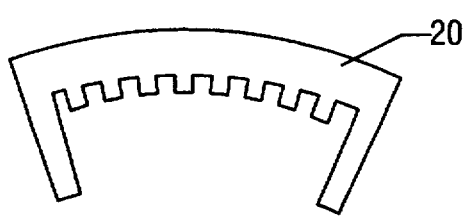
FIG. 6B illustrates a balancing sleeve formed to fit the rotor stack.

FIG. 4 illustrates apparatus allowing for the balancing of a rotor in a switched reluctance machine according to a second method of the present invention, in which material is positioned in the interpole region 18 of the rotor. In this embodiment, a plastic balancing sleeve 20 is fitted in the interpole region 18 of rotor stack 9, and a balancing compound 21 is then added to the interpole region 18 to balance rotor 10. The plastic balancing sleeve 20 can be extruded flat as shown in FIG. 6A and then be formed as shown in FIG. 6B to fit the interpole region 18 of rotor stack 9. Preferably, plastic balancing sleeve 20 is formed of polycarbonate or some other plastic with adhesive properties, to better hold balancing compound 21 in place. Balancing compound 21 is preferably formed of a high density material, such as a high density adhesive.

FIG. 4 displays the balancing sleeve 20 attached to an interpole region 18 of rotor stack 9. Balancing sleeves 20 can be attached to any of the interpole regions 18 surrounding the rotor 10. An automated process balances the rotor 10 by depositing balancing compound 21 in the plastic balancing sleeves 20. A rotor is unbalanced if its mass is unevenly distributed about its axis of rotation 15. A programmed processor can analyze a rotor's motion and determine what side of the rotor contains insufficient mass. A balancing sleeve 20 can be attached to that side of the rotor, and balancing compound 21 can be deposited in the sleeve 20 to compensate for the insufficient mass. The balancing compound 21 adheres to a ribbed surface 23 of the balancing sleeve 20. The ribbed surface 23 of the balancing sleeve 20 provides greater surface area to hold the balancing compound 21. By dispensing the compound 21 in the proper amount and in the proper location, the material addition approach balances the rotor.

Figure 5:
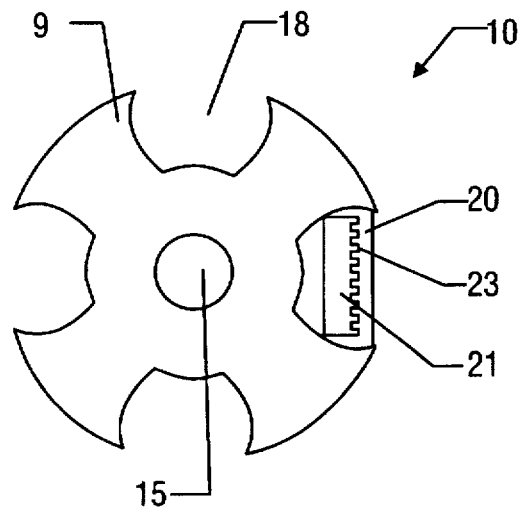
FIG. 5 illustrates a proposed lamination modification to retain a balancing sleeve at high r.p.m.'s.

FIG. 5 illustrates a proposed lamination modification 24 to retain the balancing sleeve 20 at high r.p.m.'s. The rotor's walls 24 narrow towards the rotor's outer surface, encasing the balancing sleeve 20. This modification provided greater support against the balancing compound's inertia at high r.p.m.'s.

Besides efficiently balancing the rotor, the material addition process offers numerous advantages. First, because no material is removed from the rotor 10, the rotor does not undergo the stress or fatigue of such a removal process. Second, by only utilizing the interpole regions 18 of the rotor, the process does not alter the rotor's diameter. Finally, the process is easily reversible.

Although the illustrative embodiments and related discussions describe various embodiments of this invention, the descriptions do not limit this invention; this invention is limited only by the spirit and scope of the following claims.

What is claimed is:

1. A method of balancing a rotor of a reluctance machine, the method comprising the acts of:

a) positioning a disk to one side of the rotor; and b) selectively removing material from the disk to balance the rotor.

2. The method of claim 1, wherein the act of positioning a disk to one side of the rotor includes positioning the disk to one side of the rotor of a switched reluctance machine.

3. The method of claim 1, wherein the act of selectively removing material from the disk is performed automatically through the use of a programmed processor.

4. The method of claim 1, wherein the act of selectively removing material from the disk includes shaving off material from the disk with a tooth.

5. The method of claim 1, wherein the act of selectively removing material from the disk includes drilling out material from the disk.

6. The method of claim 1, further comprising the acts of:
   a) positioning a second disk to another side of the rotor; and
   b) selectively removing material from the second disk to balance the rotor.

7. The method of claim 6, wherein the act of selectively removing material from the second disk is performed automatically through the use of a programmed processor.

8. The method of claim 6, wherein the act of removing material from the second disk includes shaving off material from the second disk with a tooth.

9. The method of claim 6, wherein the act of removing material from the second disk includes drilling out material from the second disk.

10. A reluctance machine comprising:
    a) a rotor; and
    b) a disk proximate to a side of the rotor, wherein material has been removed from the disk to balance the rotor.

11. The reluctance machine of claim 10, wherein the reluctance machine is a switched reluctance machine.

12. The reluctance machine of claim 10, wherein the disk is composed of non-active material.

13. The reluctance machine of claim 10, wherein the disk is a disk that has been shaved with a tooth.

14. The reluctance machine of claim 10, wherein the disk is a disk into which a cavity has been drilled.

15. The reluctance machine of claim 10, further comprising a second disk proximate to another side of the rotor, wherein material has been removed from the second disk to balance the rotor.

16. The reluctance machine of claim 15, wherein the second disk is composed of non-active material.

17. The reluctance machine of claim 15, wherein the second disk is a disk that has been shaved with a tooth.

18. The reluctance machine of claim 15, wherein the second disk is a disk into which a cavity has been drilled.

19. A method of balancing the rotor of a reluctance machine, the method comprising the acts of:
    a) attaching a balancing sleeve to the rotor; and
    b) depositing a balancing compound in the balancing sleeve to balance the rotor.

20. The method of claim 19, wherein the act of attaching a balancing sleeve to the rotor includes attaching the balancing sleeve to the rotor of a switched reluctance machine.

21. The method of claim 19, wherein the act of depositing a balancing compound is performed automatically through the use of a programmed processor.

22. The method of claim 19, wherein the balancing sleeve has been extruded flat, the method further including the act of forming the balancing sleeve to fit into the rotor.

23. The method of claim 19, wherein the balancing compound is a high-density material.

24. A reluctance machine comprising:
    a) a rotor;
    b) a balancing sleeve attached to the rotor; and
    c) a balancing compound deposited in the balancing sleeve.

25. The reluctance machine of claim 24, wherein the reluctance machine is a switched reluctance machine.

26. The reluctance machine of claim 24, wherein the balancing sleeve is composed of plastic.

27. The reluctance machine of claim 24, wherein the balancing sleeve has been extruded flat and then formed to fit into the rotor.

28. The reluctance machine of claim 24, wherein the balancing compound is a high-density material.

29. A reluctance machine comprising:
    a) a rotor; and
    b) means for balancing the rotor positioned in an interpole region of the rotor.

30. The reluctance machine of claim 29, wherein the reluctance machine is a switched reluctance machine.

* * * * *